US006994791B2

(12) United States Patent
Möller et al.

(10) Patent No.: US 6,994,791 B2
(45) Date of Patent: Feb. 7, 2006

(54) ADSORBENT MATERIAL AND METHOD OF PREPARING AN ADSORBENT MATERIAL

(75) Inventors: Per Möller, Kungsbacka (SE); Domingo Sanchez, Tollered (SE); Peter Gidlund, Göteborg (SE); Börje S. Persson, Göteborg (SE); Lars Jonsson, Göteborg (SE)

(73) Assignee: Akzo Nobel N.V., (NL)

( * ) Notice: Subject to any disclaimer, the term of this patent is extended or adjusted under 35 U.S.C. 154(b) by 0 days.

(21) Appl. No.: 10/607,505

(22) Filed: Jun. 27, 2003

(65) Prior Publication Data

US 2004/0059040 A1 Mar. 25, 2004

Related U.S. Application Data

(60) Provisional application No. 60/391,589, filed on Jun. 27, 2002.

(51) Int. Cl.
*B01D 15/08* (2006.01)

(52) U.S. Cl. ............... 210/656; 210/198.2; 210/502.1; 428/404; 428/447; 428/500; 502/402; 502/405; 526/279; 526/304; 526/306; 526/307.2; 526/307.4

(58) Field of Classification Search ............... 526/279, 526/304, 306, 307.2, 307.4; 428/404, 447, 428/500; 210/198.2, 502.1, 656; 502/402, 502/405

See application file for complete search history.

(56) References Cited

U.S. PATENT DOCUMENTS

| | | | | |
|---|---|---|---|---|
| 3,535,265 A | * | 10/1970 | Wieters et al. | 252/301.35 |
| 4,415,631 A | | 11/1983 | Schutijser | 428/405 |
| 4,619,970 A | | 10/1986 | Okamoto | 525/100 |
| 4,711,943 A | | 12/1987 | Harvey | 526/279 |
| 4,756,834 A | | 7/1988 | Muller | 210/635 |
| 4,835,058 A | | 5/1989 | Komiya | 428/405 |
| 4,882,048 A | | 11/1989 | Blaschke | 210/198.2 |
| 4,914,159 A | | 4/1990 | Bomer | 525/328.2 |
| 5,274,167 A | * | 12/1993 | Lange et al. | 560/40 |
| 5,868,938 A | * | 2/1999 | Bomer et al. | 210/656 |
| 5,919,523 A | | 7/1999 | Sundberg | 427/333 |
| 6,045,697 A | * | 4/2000 | Girot et al. | 210/635 |
| 6,204,403 B1 | | 3/2001 | Pepe | 556/419 |

FOREIGN PATENT DOCUMENTS

WO 98/27418 6/1998

OTHER PUBLICATIONS

Kurganov et al, "Effect of Polystyrene Coating on Pore, Structural and Chromatographic Properties of Silica Packings," Journal of Chromatography, vol. 506 (1990), pp. 391-400.

Engelhardt et al, "Polymer Encapsulated Stationary Phases with Improved Efficiency," Chromatographia, vol. 40, No. 11/12, Jun. 1995, pp. 657-661.

Engelhardt et al, "Polymer Encapsulated Stationary Phases," Chemically Modified Surfaces, Proc. Symp. 4th, H.A. Mottola and J.R. Steinmetz (Editors), 1992 Elsevier Science Publishers B.V., pp. 225-241.

Petro et al, "Polymers Immobilized on Silica Gels as Stationary Phases for Liquid Chromatography," Chromatographia, vol. 37, No. 9/10, Nov. 1993, pp. 549-561.

Cobb et al, "Electrophoretic Separations of Proteins in Capillaries with Hydrolytically Stable Surface Structures," Analytical Chemistry, vol. 62, No. 22, Nov. 15, 1990, pp. 2478-2483.

Kurganov et al, "Ion-exchange High-Performance Liquid Chromatography of Nucleotides and Polypeptides on New Types of Ion-exchange Sorbents, Based on Polystyrene-Coated Silicas," Journal of Chromatography, vol. 548 (1991), pp. 207-214.

Wei et al, "Preparation and Application of Macroporous Silica-Based Polymer-Bonded Packing for High Performance Liquid Chromatography of Proteins," J. Liq. Chrom. & Rel. Technol. vol. 21(4), (1998), pp. 447-457.

Wei et al, "Effect of Different Pore Diameter Silica Based Polymer-Bonded Phases and Mobile Phase on Separation of Proteins," Chromatographia, vol. 46, No. 11/12, Dec., 1997, pp. 637-640.

Kurganov et al, "High-Performance Ligand-Exchange Chromatography of Enantiomers" "Studies on Polystyrene-Type Chiral Phases Bonded to Microparticulate Silicas," Journal of Chromatography, vol. 261 (1983), pp. 223-233.

* cited by examiner

*Primary Examiner*—Helen L. Pezzuto
(74) *Attorney, Agent, or Firm*—White, Redway & Brown LLP

(57) ABSTRACT

The present invention relates to an adsorbent material for chromatography comprising a polymer immobilized onto a support, wherein the polymer backbone is attached to the support by one or more linkages which comprise one or more amide groups. It further relates to a method for preparing an adsorbent material for chromatography wherein a support is reacted with a polymer.

17 Claims, No Drawings

ADSORBENT MATERIAL AND METHOD OF PREPARING AN ADSORBENT MATERIAL

This application claims the benefit of provisional application 60/391,589 filed Jun. 27, 2002.

The present invention relates to an adsorbent material. It also relates to a method of preparing an adsorbent material, and the use of the adsorbent material in chromatographic separation methods.

BACKGROUND OF THE INVENTION

When using chromatography for separating individual chemical compounds present in a mixture, the choice of a stationary phase is important to get good resolution, i.e., good separation of the compounds. There is a wide variety of stationary phases available, which have different affinities to different compounds. More specifically, it is usually the surface of the stationary phase that interacts with the components of the mobile phase in a desired manner, i.e., the stationary phase acts as an adsorbent material.

Silica, or other inorganic oxides, can be used as the base material for stationary phases in chromatography. In order to functionalise the support material, a specific organic compound may be attached to the surface by reaction with e.g. silanol groups on a silica surface. By varying the compound to be bonded to the surface, various chromatographic behaviours can be achieved. However, silica and other inorganic oxides may start to dissolve at high pH, causing leakage of inorganic material, usually referred to as inorganic leakage. To avoid inorganic leakage, it is important to cover as much of the support surface as possible. The support is suitably a porous material having pores of various sizes. The main part of the surface area of the support material is the area within the pores. It is therefore important that this part can be coated with, e.g., a polymer, to avoid inorganic leakage and to give good resolution.

The chromatographic stability of an adsorbent material is also an important factor. By chromatographic stability is herein meant the ability of the adsorbent material to keep its selectivity and retention over a period of use.

Polymers may also be attached to a support surface by first attaching a monomer onto the support surface followed by further polymerisation. H. Engelhardt et al., Chemically Modified Surfaces, Proc. Symp $4^{th}$, Elsevier, 1992, 225–241, discloses a method of coating a solid support where a vinylsilane is bonded to a silica surface followed by co-polymerisation of acrylamide onto the vinyl group of the covalently attached vinylsilane. However, this will give a predominantly tentacle-type coating where most polymer chains are attached in a single point, with each polymer chain extending from the support as a "tentacle", giving a both chemically and mechanically unstable attachment. Generally, the chemical bond between a coating and e.g. silica is often unstable, especially at low pH, which may give leakage of organic material, usually referred to as organic leakage. Also, when polymerising vinyl monomers onto a solid support, remaining monomers may be present on the support surface giving chemical instability. Alternatively, a preformed polymer may be attached onto a support surface in multiple points. WO 98/27418 A1 discloses a method of coating a silica support by first binding a coupling agent onto the support surface and thereafter binding a preformed polymer to the coupling agent. The preformed polymer comprises a totally saturated carbon chain with leaving groups. It is a rather complicated method requiring several process steps. Kurganov et al, Journal of Chromatography 261 (1983) 223–233, discloses a method for bonding a copolymer of styrene and methylvinyldimethoxysilane onto a surface of silica. However, the reactivity of methylvinyldimethoxysilane is much lower than for styrene, which will favour homopolymerisation of styrene giving only few silane monomer parts in the copolymer, thereby effecting the number of linkages to the silica in a disadvantageous way. Alternatively, a chloromethylated polystyrene is reacted with aminopropyltriethoxysilane and thereafter bonded to a surface of silica. However, the basic nitrogen in the amino group in the spacer between the polymer backbone and the silica is not an inert group and may take part in unwanted reactions. U.S. Pat. No. 4,914,159 discloses a process for immobilising copolymers of (meth)acrylamides onto a silica gel. A (meth)acrylamide monomer is copolymerised with a silylating agent such as methacryloyloxypropyltrimethoxysilane.

There is a need of further improved adsorbent materials and improved methods of coating solid supports for making adsorbent materials. It is therefore an object of the present invention to provide an adsorbent material for chromatography which has high chromatographic stability, which gives excellent resolution of chemical compounds to be separated from a mixture and which has a high degree of surface coverage of the solid support. There is a further object of the present invention to provide a method for preparing an adsorbent material for chromatography, which comprises few steps, which gives an adsorbent material with high degree of surface coverage of the solid support, and which enables flexibility in providing adsorbent materials with different chromatographic behaviour.

THE INVENTION

According to the invention it has surprisingly been found that an adsorbent material for chromatography having chromatographic stability, having a high degree of surface coverage of a support, giving excellent resolution, and which can be tailor-made for a desired separation characteristic, can be provided. The adsorbent material for chromatography comprises a polymer immobilised onto a support, wherein the polymer backbone is attached to the support by one or more linkages which comprise one or more amide groups.

The present invention further comprises a method of preparing an adsorbent material for chromatography comprising immobilising a polymer onto a support, wherein the support is reacted with the polymer, thereby forming one or more linkages between the polymer backbone and the support, each linkage comprises one or more amide groups. Furthermore, the present invention comprises a method of preparing an adsorbent material for chromatography comprising providing a polymer from a monomer mixture comprising an amide group containing silane, reacting the polymer with a support to form one or more linkages between the polymer backbone and the support. In both methods of the invention, the polymer is suitably added as a solution to a suspension of the support. The support is suitably filtered off, washed, and dried. A further acid treatment step is also suitably performed, suitably followed by an end-capping step wherein an end-capping agent, for example, chlorotrimethylsilane, hexamethyldisilazane or (N,N-dimethylamino)-trimethylsilane, is added to the support.

The present invention further comprises the use of the adsorbent material for chromatography in chromatographic separation methods. It also comprises the use of an adsorbent material for chromatography prepared according to any of the methods of the present invention, in chromatographic separation methods. Such chromatographic separation methods can be, for example, HPLC, supercritical fluid chromatography (SFC), and simulating moving bed (SMB).

The present invention further comprises a method of separating chemical compounds from a mixture comprising contacting the mixture with the adsorbent material for chromatography according to the present invention.

The support material of the present invention is suitably a material whose surface comprises groups susceptible to reaction with groups on the polymer. The support material can be either an organic or an inorganic material. Organic support materials include polymeric support materials such as poly(styrene-divinyl benzene), polyacrylate resins and polyacrylamide resins. Organic support materials, such as polymeric support materials, are suitably functionalised to comprise groups, such as hydroxyl groups, halogen groups, amino groups, or vinyl groups, susceptible to reaction with the polymer to be immobilised onto the support. Inorganic support materials include inorganic oxides. Suitably, the surface of inorganic support materials comprises hydroxyl groups or groups convertible to hydroxyl groups. Suitably, the support is an inorganic support, preferably an inorganic oxide such as alumina, titania, zirconia, chromia, silica, boria, toria, beryllia, silica-alumina and combinations thereof. Most preferably, the support is silica. The support material can be a particulate material, or, in the form of a piece, a sheet, a rod or a capillary coating. Preferably, the support material is a particulate material, suitably having a volume average particle size of from about 0.5 to about 500 $\mu$m, preferably from about 0.7 to about 200 $\mu$m, most preferably from about 1 to about 40 $\mu$m. The particles are preferably substantially spherical. The particulate material suitably comprises pores. The pore size, pore volume and specific surface area of the particulate support material may vary depending on the type of support material used, the characteristics of the polymer to be linked to the support and the desired separation characteristics when in use. The pore size range may be different for diffusion pores and perfusion pores (flow pores). For diffusion pores, the pore size is suitably from about 20 to about 4000 Å, preferably from about 50 to about 500 Å. For perfusion pores, the pore size is suitably from about 1000 to about 80000 Å, preferably from about 5000 to about 50000 Å. The pore volume is suitably from about 0.1 to about 4 ml/g, preferably from about 0.3 to about 2 ml/g, most preferably from about 0.5 to about 1.5 ml/g. The specific surface area is suitably from about 1 to about 1000 m$^2$/g, preferably from about 25 to about 700 m$^2$/g. most preferably from about 100 to about 500 m$^2$/g.

The polymer of the present invention suitably comprises groups susceptible to reaction with the support. Such groups can be, for example, vinyl groups, alkoxy groups such as methoxy, ethoxy, propoxy, butoxy and isobutoxy, halogens such as chlorine, bromine, iodine, and fluorine, secondary amino groups such as dialkylamine, an imidazol group, a morpholine group, or an azide group. Suitably, the polymer is a preformed polymer, preferably a co-polymer. The polymer is suitably prepared by polymerising a monomer mixture comprising at least one vinyl monomer $m_1$ of the general formula (I):

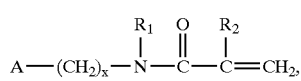
(I)

wherein A is a halogen, a vinyl group, or, a silane group, wherein x=1–30, $R_1$ is hydrogen or $C_1$–$C_4$ alkyl, and $R_2$ is hydrogen or methyl. The monomer mixture suitably further comprises at least one vinyl monomer $m_2$ of the general formula (II):

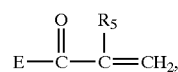
(II)

wherein $R_5$ is hydrogen or methyl, and E is any of the groups:

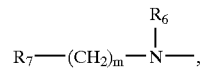

or

wherein m=0 to 20, $R_6$ is hydrogen or $C_1$–$C_4$ alkyl, and $R_7$ is a functional moiety selected to give the desired separation characteristics of the finished adsorbent material. By the desired separation characteristics, is herein meant that a certain resolution between a specific chemical compound of interest and other compounds is achieved. By varying $R_7$, the affinity of the adsorbent material to certain chemical compounds will be different. For example, properties such as hydrophobic-, dipol-dipol-, $\pi$-$\pi$-, electrostatic-, and steric interactions, or chiral discrimination can be varied. The functional moiety $R_7$ can be varied within wide limits and can be, for example, hydrogen, $C_1$–$C_{30}$ alkyl, $C_1$–$C_{30}$ hydroxyalkyl, phenyl, benzyl, carboxyl, $C_1$–$C_{30}$ alkylcarboxyl, phenylcarboxyl, nitrophenyl, chlorophenyl, $C_1$–$C_{30}$ aminoalkyl, aminophenyl, —N(Me)$_3^+$Cl$^-$, and —N(Me)$_2$(CH$_2$)$_p$SO$_3$, wherein p=0–5. When $R_7$ is any of $C_1$–$C_{30}$ alkyl, $C_1$–$C_{30}$ hydroxyalkyl, $C_1$–$C_{30}$ alkylcarboxyl, and $C_1$–$C_{30}$ aminoalkyl, preferably $C_1$–$C_{10}$ alkyl, $C_1$–$C_{10}$ hydroxyalkyl, $C_1$–$C_{10}$ alkylcarboxyl, and $C_1$–$C_{10}$ aminoalkyl is used, most preferably $C_1$–$C_5$ alkyl, $C_1$–$C_5$ hydroxyalkyl, $C_1$–$C_5$ alkylcarboxyl, and $C_1$–$C_5$ aminoalkyl. The monomer mixture suitably further comprises at least one vinyl monomer $m_3$ of the general formula (III):

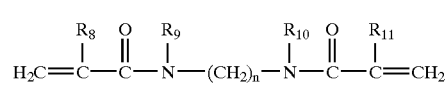
(III)

wherein n=1 to 20, $R_8$ is hydrogen or methyl, $R_9$ is $C_1$–$C_4$ alkyl, $R_{10}$ is $C_1$–$C_4$ alkyl, $R_{11}$ is hydrogen or methyl.

For a polymer to be immobilised onto an inorganic support material, $m_1$ is preferably a monomer comprising a silane group. The silane group is suitably of the general formula (IV):

(IV), wherein B is $C_1$–$C_4$ alkyl, $C_1$–$C_4$ alkoxy, halogen, hydroxyl, hydrogen, —N(R$_3$)$_z$(R$_4$)$_{2-z}$, an imidazol group, a morpholine group, or an azide group, D is $C_1$–$C_4$ alkyl, y=1–3, z=1–2, R$_3$ and R$_4$ are, independently from each other, hydrogen, $C_1$–$C_{20}$ alkyl, or aryl. Preferred monomers $m_1$ are (meth)acrylamido alkylalkoxysilanes such as (meth)acrylamidopropyl-trimethoxysilane, (meth)acrylamidopropyldimethoxymethylsilane, (meth)acrylamidopropyl-dimethoxyethylsilane, (meth)acrylamidopropyl-monomethoxydimethylsilane, (meth)acryl-amidopropylomonomethoxydiethylsilane, (meth)acrylamidopropyltriethoxysilane, (meth)acrylamidopropyldiethoxymethylsilane, (meth)acrylamidopropyldiethoxyethylsilane, (meth)acrylamido propylmonoethoxydimethylsilane, (meth)acrylamido propylmonoethoxydiethylsilane, (meth)acrylamidobutyl-trimethoxy-silane, (meth)acrylamidobutyldimethoxy-methylsilane, (meth)acrylamidobutyldimethoxyethylsilane, (meth)acrylamidobutyl-monomethoxydimethylsilane, (meth)acrylamidobutylmonomethoxydiethylsilane, (meth)acrylamidobutyltriethoxysilane, (meth)acrylamidobutyldiethoxymethylsilane, (meth)acrylamidobutyl-diethoxyethylsilane, (meth)acrylamidobutylmonoethoxy-dimethylsilane, (meth)acrylamidobutylmonoethoxydiethylsilane, (meth)acrylamidoalkylamimosilanes such as (meth)acrylamidodimethylaminosilane, and (meth)acryl-amidodiethylaminosilane, (meth)acrylamidoalkylhalogensilanes such as (meth)acryl-amidodimethylchlorosilane, (meth)acrylamidodiethylchlorosilane, (meth)acryl-amidodimpropylchlorosilane, (meth)acryl-amidomethyidichlorosilane (meth)acrylamidoethyl-dichlorosilane, and (meth)acrylamido-propyidichlorosilane.

Examples of preferred (meth)acrylamide-based monomers $m_2$ are functionalised, or non-functionalised, $C_1$–$C_{30}$ alkylbutyl(meth)acrylamides such as propyl(meth)acrylamide, isopropyl(meth)acrylamide, butyl(meth)acrylamide, tert-butyl(meth)acrylamide, pentyl(meth)acrylamide, hexyl (meth)acrylamide, heptyl(meth)acrylamide, octyl(meth)-acrylamide, nonyl(meth)acrylamide, decyl(meth)acrylamide, and, octadecyl(meth)-acrylamide.

Examples of preferred monomers $m_3$ are bis-acrylamides such as N,N'-ethylenebis-acrylamide, N,N'-propylenebis-acrylamide, and, N,N'-butylenebis-acrylamide.

The monomers, $m_1$, $m_2$ and $m_3$, are suitably selected so that a random distribution of monomers in the polymer is achieved.

The polymer suitably comprises from about 1 to about 100 mole % of units of monomer $m_1$, preferably from about 10 to about 90 mole %, most preferably from about 30 to about 70 mole %. Also, the polymer suitably comprises from 0 to about 99 mole % of units of monomer $m_2$, preferably from about 10 to about 90 mole %, most preferably from about 30 to about 70 mole %. Furthermore, the polymer suitably comprises from 0 to about 99 mole % of units of monomer $m_3$, preferably from 0 to about 50 mole %.

The weight average molecular weight of the polymer is suitably from about 1000 to about 500000 g/mole, preferably from about 1500 to about 100000 g/mole, most preferably from about 2000 to about 25000 g/mole.

The number of monomer units per polymer chain is suitably from about 5 to about 2000, preferably from about 8 to about 500, most preferably from about 10 to about 100.

The polymer is suitably prepared by polymerising the monomers in an organic solvent in the presence of an initiator, and optionally a chain-transfer agent such as a mercapto compound. The solvent may be any organic solvent suitable as polymerisation medium and includes xylene, toluene, dioxane, tetrahydrofurane, chlorinated hydrocarbons, benzene, dimethylformamide, and N-methylpyrrolidone. Examples of suitable initiators include peroxides and azo-compounds.

The polymer of the present invention is suitably covalently bonded to the support material.

In a preferred embodiment of the present invention, a preformed polymer, which is a copolymer of an acrylamide monomer comprising silane and alkoxy groups and a further acrylamide monomer is covalently bonded to the surface of a silica particle.

The polymer is suitably reacted with the support material by preparing a mixture from a suspension of the support material in a solvent with a solution of the polymer. The solvent used to suspend the support material is suitably an organic solvent. Suitably, the amount support material added to the solvent is from about 0.01 to about 1 g support material /ml solvent, preferably from about 0.05 to about 0.5 g/ml. The amount polymer, added to the support material is a measurement of the degree of surface coverage of the support material. The amount polymer added to the support material, calculated as monomers within the polymer, is suitably from about 0.5 to about 20 $\mu$mole of monomer per m$^2$ support material surface, preferably from about 1 to about 15 $\mu$mole of monomer per m$^2$ support material surface, even more preferably from about 4 to about 12 $\mu$mole of monomer per m$^2$ support material surface, most preferably from about 6 to about 10 $\mu$mole of monomer per m$^2$ support material surface. If the support material comprises pores, the amount polymer added to the support material may also be dependent on the pore size of the support material. For diffusion pores with pore sizes from 20 up to 150 Å, the amount polymer added to the support material, calculated as monomers within the polymer, is preferably from about 3 to about 10 $\mu$mole of monomer per m$^2$ support material surface. For diffusion pores with pore sizes from above 150 up to 250 Å, the amount polymer added to the support material, calculated as monomers within the polymer, is preferably from about 5 to about 12 $\mu$mole of monomer per m$^2$ support material surface. For diffusion pores with pore sizes from above 250 up to 500 Å, the amount polymer added to the support material, calculated as monomers within the polymer, is preferably from about 7 to about 15 $\mu$mole of monomer per m$^2$ support material surface.

The temperature during the reaction is suitably from about 10 to about 200° C., preferably from about 50 to about 160° C. Suitably, the mixture is kept under inert atmosphere.

The invention will now further be described in connection with the following examples which, however, not should be interpreted as limiting the scope of the invention.

EXAMPLES

Example 1

8.5 g N-(tri-methoxypropylsilyl) acrylamide and 13.4 g n-octyl acrylamide were dissolved in 65 ml xylene. This solution was added into a reaction vessel together with a peroxide initiator dissolved in 45 ml xylene. The polymerisation was performed during 7 hours under inert atmosphere at 140° C. The resulting polymer had a weight average molecular weight of 7000 Dalton. The conversion of monomers was more than 98%.

Example 2

4.0 g of silica particles of the type Kromasil® having a volume average particle size of 5 $\mu$m, a pore size of 100 Å, and a specific surface area of 330 m$^2$/g, were suspended in 30 ml xylene. 12 ml of the polymer solution of example 1 was added and the mixture was left for 18 hours at 140° C. under inert atmosphere. The particles were thereafter filtered off, washed and dried. The particles were analysed by elemental analysis to comprise 13.7% carbon and 1.53% nitrogen, which corresponds to a coverage of 4.5 $\mu$mole/m$^2$, calculated as μmole/m² of monomers included in the polymer. The formula for calculating the surface coverage (for nitrogen-containing polymers) is: $N_c 10^6/[(14 \times 100 \times n_c - (N_c \times M - N_c)) \times S]$, wherein $N_c$ is the measured nitrogen weight percentage, $n_c$ is the number of nitrogen atoms in the monomer of the polymer bonded to silica, M is the average molecular weight of the monomer(s) included in the polymer, and S is the specific surface area of the silica.

Example 3

The same procedure as in example 2 was employed, but with using silica particles of the type Kromasil® having a volume average particle size of 5 μm, a pore size of 200 Å, and a specific surface area of 213 m²/g. The particles were analysed to comprise 11.3% carbon and 1.285% nitrogen, which corresponds to a surface coverage of 5.2 μmole/m².

Example 4

The same procedure as in example 2 was employed, but with using silica particles of the type Kromasil® having a volume average particle size of 5 μm, a pore size of 300 Å, and a specific surface area of 77 m²/g. The particles were analysed to comprise 5.75% carbon and 0.735% nitrogen, which corresponds to a surface coverage of 7.6 μmole/m².

Example 5

5.5 g N-(monomethoxy-dimethyl-propylsilyl) acrylamide and 6.2 g isopropyl acrylamide were dissolved in 100 ml xylene. This solution was added into a reaction vessel together with a peroxide initiator dissolved in 45 ml xylene. The polymerisation was performed during 6 hours under inert atmosphere at 140° C. The resulting polymer had a weight average molecular weight of 3400 Dalton. The conversion of monomers was more than 98%.

Example 6

5.5 g N-(monomethoxy-dimethyl-propylsilyl) acrylamide and 7.0 g n-butyl acrylamide were dissolved in 100 ml xylene. This solution was added into a reaction vessel together with a peroxide initiator dissolved in 45 ml xylene. The polymerisation was performed during 6 hours under inert atmosphere at 140° C. The resulting polymer had a weight average molecular weight of 2500 Dalton. The conversion of monomers was more than 98%.

Example 7

15 g of silica particles of the type Kromasil® having a volume average particle size of 5 μm, a pore size of 100 Å, and a specific surface area of 330 m²/g, were suspended in 150 ml polymer solution made according to example 5. The mixture was left for 18 hours at 140° C. under inert atmosphere. The particles were thereafter filtered off, washed and dried. The particles were analysed by elemental analysis to comprise 17.6% carbon and 2.7% nitrogen, which corresponds to a coverage of 7.6 μmole/m², calculated as μmole/m² of monomers included in the polymer.

Example 8

The same procedure as in example 7 was employed, except that a polymer solution made according to example 6 was used. The particles were analysed by elemental analysis to comprise 16.7% carbon and 2.5% nitrogen, which corresponds to a surface coverage of 7.0 μmole/m², calculated as μmole/m² of monomers included in the polymer.

What is claimed is:

1. An adsorbent material for chromatography comprising a polymer immobilised onto a support, wherein the polymer backbone is attached to the support by one or more linkages which comprise one or more amide groups, wherein the polymer is prepared by polymerising a monomer mixture comprising at least one vinyl monomer $m_1$ having groups susceptible to reaction with the support and having one or more amide groups, the vinyl monomer $m_1$ having the general formula (I):

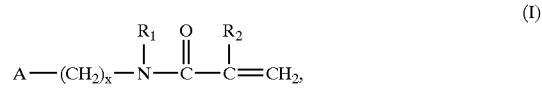

(I)

wherein A is a halogen, a vinyl group, or a silane group, wherein x=1–30, $R_1$ is hydrogen or $C_1$–$C_4$ alkyl, and $R_2$ is hydrogen or methyl.

2. An adsorbent material according to claim 1, wherein the support is an inorganic oxide.

3. An adsorbent material according to claim 2, wherein the support is silica.

4. An adsorbent material according to claim 1, wherein the silane group has the general formula (IV):

(IV), wherein B is $C_1$–$C_4$ alkyl, $C_1$–$C_4$ alkoxy, halogen, hydroxyl, hydrogen, —N(R$_3$)$_z$(R$_4$)$_{2-z}$, an imidazol group, a morpholine group, or an azide group, D is $C_1$–$C_4$ alkyl, y=1–3, z=1–2, $R_3$ and $R_4$ are, independently from each other, hydrogen, $C_1$–$C_{20}$ alkyl, or aryl.

5. An adsorbent material according to claim 1, wherein the monomer mixture further comprises at least one vinyl monomer $m_2$ of the general formula:

(II)

wherein $R_5$ is hydrogen or methyl, and E is any of the groups:

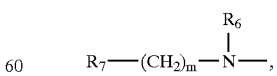

or

wherein m=0 to 20, $R_6$ is hydrogen or $C_1$–$C_4$ alkyl, and $R_7$ is a functional moiety selected to give the desired separation characteristics of the finished adsorbent material.

6. An adsorbent material according to claim 1, wherein the monomer mixture further comprises at least one vinyl monomer $m_3$ of the general formula (III):

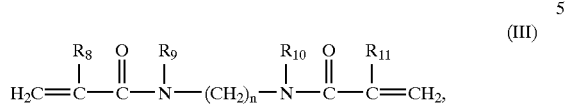
(III)

wherein n=1 to 20, $R_8$ is hydrogen or methyl, $R_9$ is hydrogen or $C_1$–$C_4$ alkyl, $R_{10}$ is hydrogen or $C_1$–$C_4$ alkyl, and $R_{11}$ is hydrogen or methyl.

7. An adsorbent material according to claim 1, wherein the weight average molecular weight of the polymer is from about 2000 to about 25000 g/mole.

8. An adsorbent material according to claim 1, wherein the support has a volume average particle size of from about 1 to about 40 μm.

9. An adsorbent material for chromatography obtained by immobilising a polymer onto a support, wherein the support is reacted with the polymer, thereby forming one or more linkages between the polymer backbone and the support, each linkage comprising one or more amide groups, wherein the polymer is prepared by polymerising a monomer mixture comprising at least one vinyl monomer $m_1$ having groups susceptible to reaction with the support and having one or more amide groups, wherein the vinyl monomer $m_1$ is of the general formula (I):

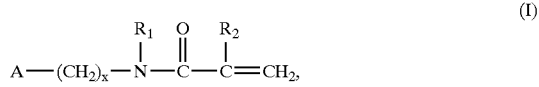
(I)

wherein A is a halogen, a vinyl group, or a silane group, wherein x=1–30, $R_1$ is hydrogen or $C_1$–$C_4$ alkyl, and $R_2$ is hydrogen or methyl.

10. An adsorbent material according to claim 9, wherein the support is an inorganic oxide.

11. An adsorbent material according to claim 9, wherein the support is silica.

12. An adsorbent material according to claim 9, wherein the silane group has the general formula (IV):

$(B)_y(D)_{3-y}Si-$     (IV), wherein B is $C_1$–$C_4$ alkyl, $C_1$–$C_4$ alkoxy, halogen, hydroxyl, hydrogen, $-N(R_3)_z(R_4)_{2-z}$, an imidazol group, a morpholine group, or an azide group, D is $C_1$–$C_4$ alkyl, y=1–3, z=1–2, $R_3$ and $R_4$ are, independently from each other, hydrogen, $C_{1-C20}$ alkyl, or aryl.

13. An adsorbent material according to claim 9, wherein the monomer mixture further compnses at least one vinyl monomer $m_2$ of the general formula:

(II)

wherein $R_5$ is hydrogen or methyl, and E is any of the groups:

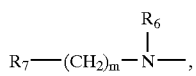

or

wherein m=0 to 20, $R_6$ is hydrogen or $C_1$–$C_4$ alkyl, and $R_7$ is a functional moiety selected to give the desired separation characteristics of the finished adsorbent material.

14. An adsorbent material according to claim 13, wherein the monomer mixture further comprises at least one vinyl monomer $m_3$ of the general formula (III):

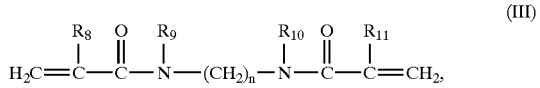
(III)

wherein n=1 to 20, $R_8$ is hydrogen or methyl, $R_9$ is hydrogen or $C_1$–$C_4$ alkyl, $R_{10}$ is hydrogen or $C_1$–$C_4$ alkyl, and $R_{11}$ is hydrogen or methyl.

15. An adsorbent material according to claim 9, wherein the weight average molecular weight of the polymer is from about 2000 to about 25000 g/mole.

16. An adsorbent material according to claim 9, wherein the support has a volume average particle size of from about 1 to about 40 μm.

17. An adsorbent material according to claim 9, wherein the polymer is added as a solution to a suspension of the support.

\* \* \* \* \*